US012779955B2

(12) United States Patent
Boehm et al.

(10) Patent No.: US 12,779,955 B2
(45) Date of Patent: Nov. 3, 2026

(54) THIN SUN VISOR WITH ROTARY DETENT MECHANISM

(71) Applicant: Tesla, Inc., Austin, TX (US)

(72) Inventors: Markus Boehm, Fremont, CA (US); Miguel Angel Quezada Gomez, San Jose, CA (US); Shakeel Theodore, Fremont, CA (US); Saurabh Dhavane, Fremont, CA (US)

(73) Assignee: Tesla, Inc., Austin, TX (US)

( * ) Notice: Subject to any disclaimer, the term of this patent is extended or adjusted under 35 U.S.C. 154(b) by 287 days.

(21) Appl. No.: 18/646,278

(22) Filed: Apr. 25, 2024

(65) Prior Publication Data

US 2025/0332890 A1 Oct. 30, 2025

(51) Int. Cl.
*B60J 3/02* (2006.01)
*B60Q 3/252* (2017.01)

(52) U.S. Cl.
CPC ............ *B60J 3/0239* (2013.01); *B60Q 3/252* (2017.02)

(58) Field of Classification Search
CPC ........ B60J 3/213; B60J 3/0239; B60J 3/0265; B60J 3/0278; B60J 3/0282; B60Q 3/252; B60R 16/0207; B60R 16/023; B60R 16/033; B60R 2001/1215; B60Y 2410/115; H02J 50/005
See application file for complete search history.

(56) References Cited

U.S. PATENT DOCUMENTS

2017/0174051 A1* 6/2017 Welter .................. B60J 3/0265
2020/0039332 A1 2/2020 Welter

FOREIGN PATENT DOCUMENTS

| | | |
|---|---|---|
| CN | 120840360 | 10/2025 |
| DE | 3603852 | 8/1987 |
| DE | 4104032 | 4/1992 |
| DE | 19953310 | 5/2000 |
| DE | 10025112 | 6/2006 |

(Continued)

OTHER PUBLICATIONS

FR 3047929 A1 (Year: 2017).*

(Continued)

*Primary Examiner* — Lori Lyjak
(74) *Attorney, Agent, or Firm* — Schwegman Lundberg & Woessner, P.A.

(57) ABSTRACT

An automotive sun visor is disclosed with enhanced functionality and aesthetic appeal for vehicle interiors. The sun visor includes a frame with a rotary detent mechanism housed within a hinge tube, facilitating precise rotational movement and secure positioning. The frame is constructed from two heat-welded plastic frame halves, eliminating the need for an expanded polypropylene layer, and reducing thickness. The sun visor features an integrated mirror made from advanced materials such as gorilla glass or polycarbonate, and LED lamps for illumination. The rotary detent mechanism comprises a detent bar, detent springs, and a detent subframe, providing a clicking action for tactile feedback when the sun visor reaches a stowed position. The sun visor's design allows for axial adjustment and pivotal movement between stowed and operational positions, contributing to safety and comfort within the vehicle.

9 Claims, 10 Drawing Sheets

(56) References Cited

FOREIGN PATENT DOCUMENTS

| | | | | |
|---|---|---|---|---|
| EP | 3581414 A1 * | 12/2019 | ............ | B60J 3/0239 |
| JP | 2025168303 | 11/2025 | | |

OTHER PUBLICATIONS

"European Application Serial No. 25172454.8, Response filed Dec. 16, 2025 to Extended European Search Report mailed Sep. 3, 3025", 22 pgs.

"European Application Serial No. 25172454.8, Extended European Search Report mailed Sep. 3, 2025", 12 pgs.

* cited by examiner

THIN SUN VISOR WITH ROTARY DETENT MECHANISM

BACKGROUND

Sun visors have become an integral component of vehicle interiors, serving a primary function of protecting the driver's and passengers' eyes from the glare of the sun. This glare can be a significant hazard, as it can impair the driver's vision, leading to discomfort and potentially dangerous driving conditions. The design and functionality of sun visors have evolved over time to meet various needs, including aesthetic preferences, safety regulations, and ergonomic considerations.

Traditionally, sun visors have been designed as flat panels that can be flipped down or rotated to block sunlight from the front or side windows. They are typically mounted above the windshield on a swivel that allows for this movement. The materials used in their construction have varied, with early models often made from simple, rigid materials that provided basic functionality without much consideration for the interior design of the vehicle.

As automotive design has progressed, the integration of sun visors into the vehicle's overall aesthetic has become more important. Designers have sought to create sun visors that not only perform their intended function but also blend seamlessly with the rest of the vehicle's interior. This has led to the exploration of various materials and shapes that can contribute to a more luxurious and cohesive look.

The challenge of providing adequate visibility while minimizing the obstruction of the driver's field of view has been a constant concern in sun visor design. The size and shape of sun visors must be carefully considered to ensure they can effectively block sunlight without becoming a visual impediment themselves. This balance is crucial for maintaining safety standards while also delivering comfort and convenience to the occupants of the vehicle.

Another consideration in the design of sun visors is their impact on the vehicle's interior space. As vehicles have become more compact, the need to maximize headroom and maintain an open, airy cabin has grown. This has led to efforts to reduce the thickness and profile of sun visors, making them less intrusive while still providing the necessary sun-blocking function.

Durability and ease of use are also key factors in the development of sun visors. They are frequently handled and adjusted, often in quick, sometimes forceful movements as drivers react to changing light conditions. As such, the mechanisms that allow for the movement and positioning of sun visors must be robust and able to withstand repeated use over the life of the vehicle.

In addition to their primary function, sun visors have also been adapted to include additional features for the convenience of vehicle occupants. These have included mirrors, typically with a cover that can be opened or closed, and lighting to aid in visibility. The integration of these features has required additional engineering to ensure that the added components do not compromise the sun visor's functionality or durability.

Overall, the field of sun visor design has been driven by the need to balance functionality with aesthetics, durability with convenience, and space-saving and cost considerations with safety requirements. The evolution of sun visors reflects broader trends in automotive design, where every component seeks to contribute to the vehicle's performance, comfort, and appeal.

BRIEF SUMMARY

Some examples herein relate to an automotive sun visor designed to enhance the functionality and aesthetic appeal of vehicle interiors while providing effective sun glare protection for occupants. Some examples incorporate a rotary detent mechanism that seeks to facilitate precise rotational movement and secure positioning of the sun visor ensuring it remains fixed in a desired orientation to block sunlight.

In some examples, a significant reduction in the sun visor's thickness and weight is achieved through the use of advanced materials, including polyoxymethylene for the detent mechanism and the option of gorilla glass or polycarbonate for a mirror component. The sun visor's hinge design includes an extruded aluminum tube contributing to a sleeker profile and a flush interface with the vehicle's headliner.

In some examples, the construction of the sun visor seeks to improve over traditional designs by eliminating an expanded polypropylene (EPP) layer and instead employ two plastic frame halves that are heat-welded together. This modification not only reduces the overall thickness of the sun visor but also simplifies the manufacturing process and may lead to cost savings.

Some examples are intended for universal applicability across customer road vehicles and offer a competitive advantage by providing mass and cost reductions per unit when compared to legacy sun visor designs. A thinner, lighter, and more user-friendly sun visor aligns with modern vehicle design requirements, offering both functional and aesthetic improvements.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

An automotive sun visor is now described that seeks to provide enhanced functionality and aesthetic appeal for vehicle interiors. An example sun visor includes a frame with a rotary detent mechanism housed within a hinge tube, facilitating precise rotational movement and secure positioning. The frame is constructed from two heat-welded plastic frame halves, eliminating the need for an expanded polypropylene layer, and reducing thickness. The sun visor features an integrated mirror made from advanced materials such as gorilla glass or polycarbonate, and LED lamps for illumination. The rotary detent mechanism comprises a detent bar, detent springs, and a detent subframe, providing a clicking action for tactile feedback when the sun visor reaches a stowed position. The sun visor's design allows for axial adjustment and pivotal movement between stowed and operational positions, contributing to safety and comfort within the vehicle.

Figure 1:
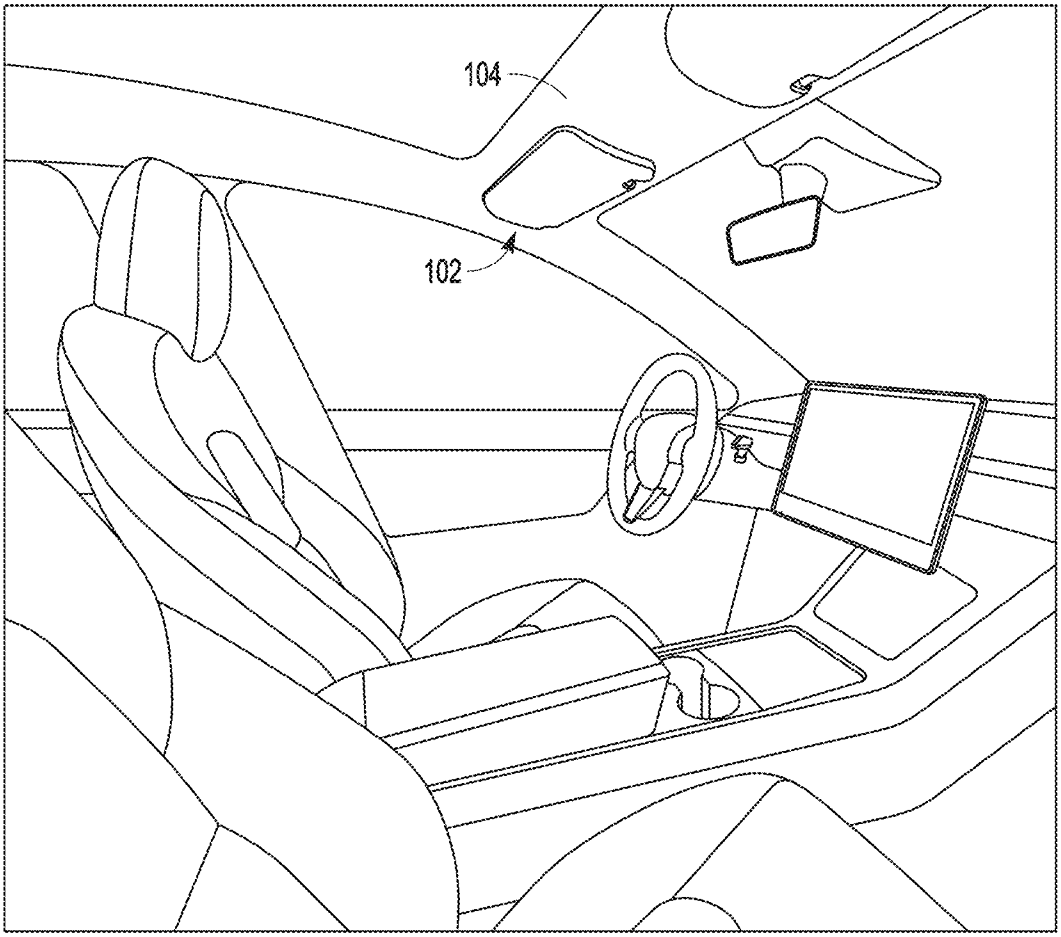
FIG. 1 is a pictorial view of an example motor vehicle interior showing the sun visor in a stowed position flush against the vehicle's headliner.

FIG. 1 is a pictorial view of an example motor vehicle interior showing an example sun visor 102 lying in a stowed position flush against a headliner 104 of the vehicle interior, according to an example embodiment.

Figure 2A:
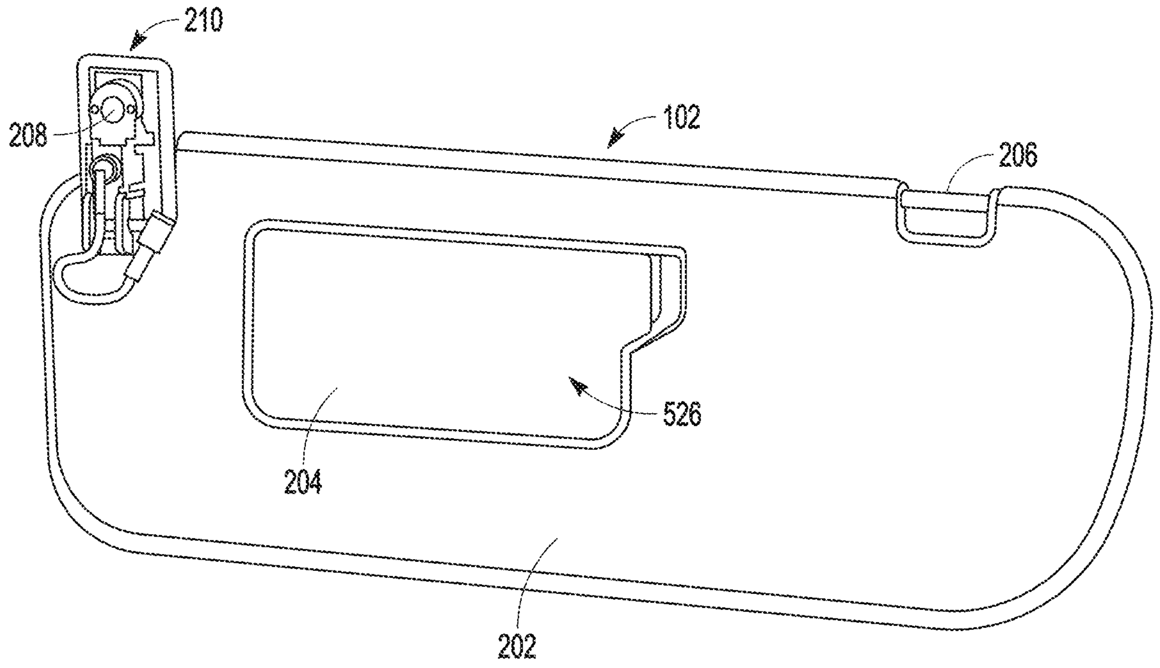
FIG. 2A is a pictorial view of the sun visor, illustrating the main body or frame, the mirror, and the D-ring.
Figure 2B:
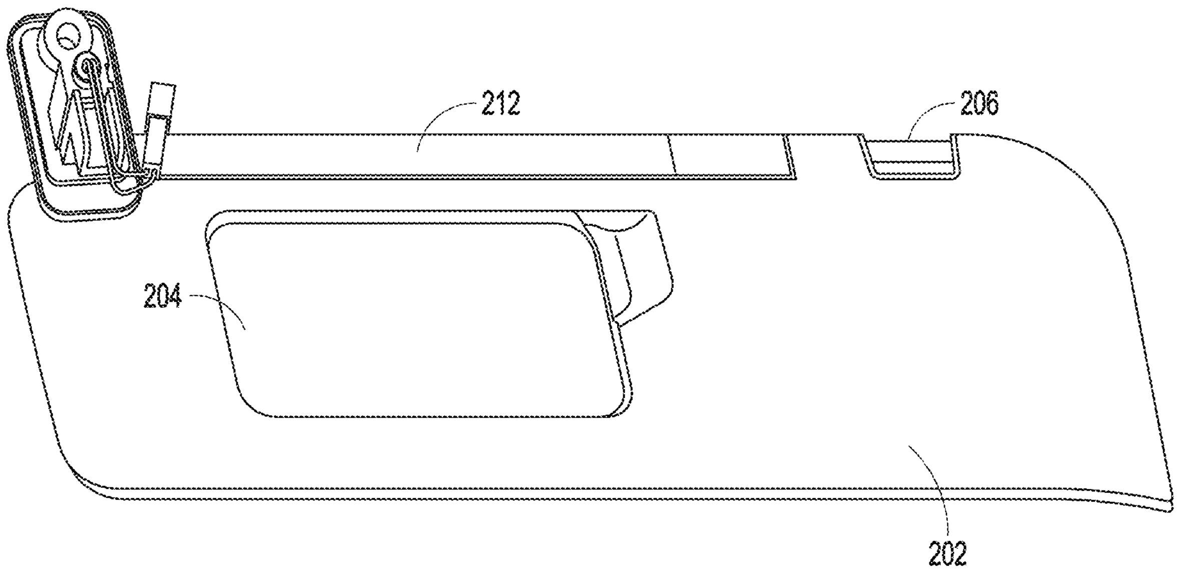
FIG. 2B is a pictorial view of the sun visor, detailing the internal hinge tube and its relationship with the frame and mirror.

FIG. 2A-FIG. 2B show pictorial views of an example sun visor 102. Generally speaking, an example sun visor 102 includes a main body or frame 202, a mirror 204, and a D-ring 206 provided towards one end of the sun visor 102. The frame 202 of the sun visor 102 can also be referred to as a glare shield, or visor panel. In some examples, the frame 202 comprises two frame halves that are heat-welded together, as described more fully below. In some examples, the mirror 204 can be covered by a mirror cover assembly 526 when not in use. The D-ring 206 serves to clip the sun visor 102 to the headliner 104, more typically to a complementary headliner bracket or clip (not shown) in the stowed position of FIG. 1. The D-ring 206 of the sun visor 102 can be unclipped from the headliner 104 by a vehicle operator to release the sun visor 102 and allow it to swing horizontally around an upright swing axis 208 defined by an elbow tube supported rotatably in a mounting bracket 210.

Figure 3:
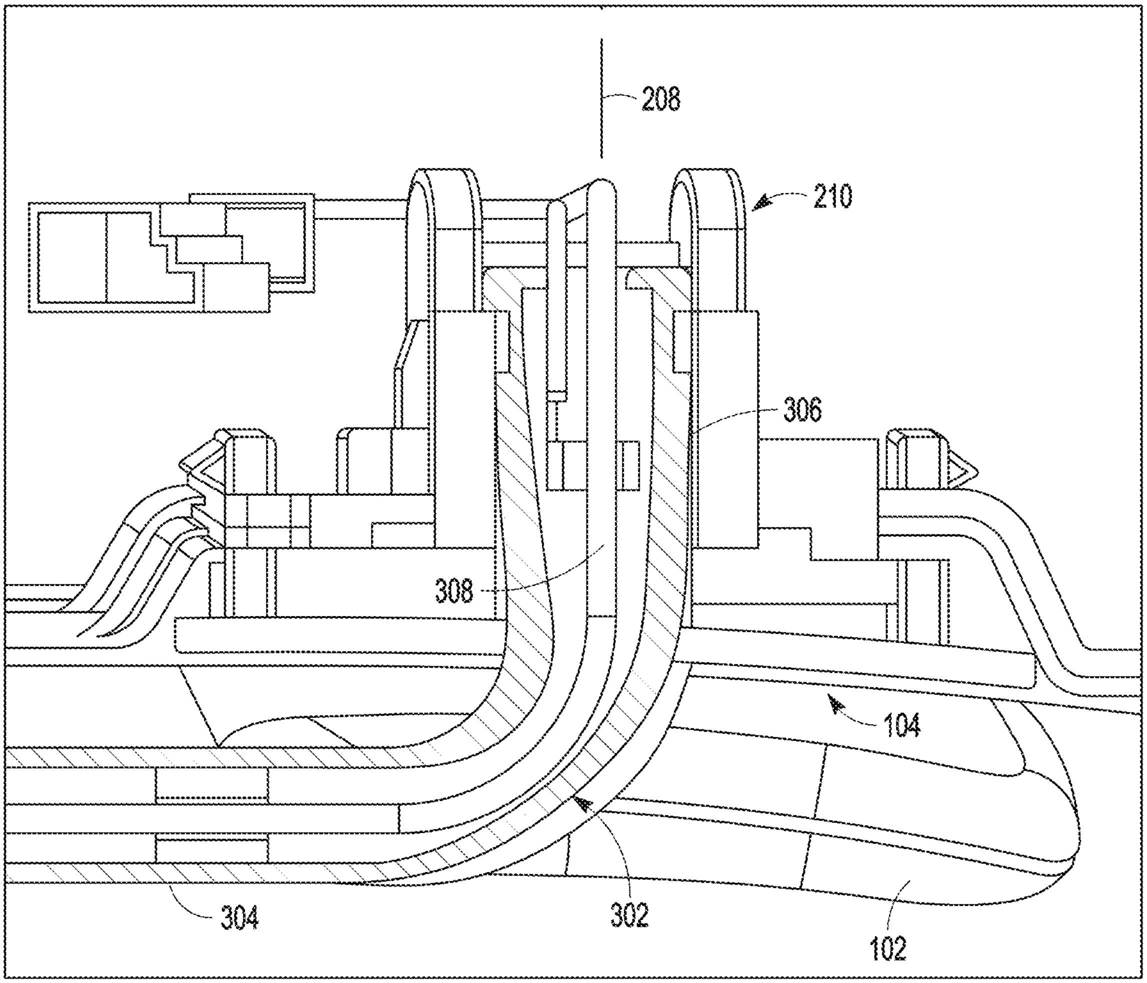
FIG. 3 is a cross-sectional view showing the elbow tube of the sun visor supported rotatably in the mounting bracket.

The mounting bracket 210 is designed to fit snugly into or above the headliner 104, as shown for example in cross sectional view in FIG. 3. In this view, an example elbow tube 302 carrying the sun visor 102 is shown supported rotatably in the mounting bracket 210. The elbow tube 302 is hollow and can accommodate one or more power cables 308, or other componentry and wiring (not shown). A generally horizontal portion 304 of the elbow tube 302 supports the sun visor 102 on the elbow tube 302, as shown. A generally vertical portion 306 of the elbow tube 302 defines the upright swing axis 208, also as shown.

FIG. 2B shows an internal hinge tube 212 of the sun visor 102. The hinge tube 212 is supported slidably and rotatably on the elbow tube 302. The slidable nature of the hinge tube 212 allows the sun visor 102 to be moved axially by a vehicle operator along the elbow tube 302 to adjust the axial position of the sun visor 102 in use, as needed. The sun visor 102 can also be pivoted up i.e., around a longitudinal axis of the horizontal portion 304 of the elbow tube 302 into the stowed position and, when needed as a sun shield, pivoted down away from the headliner 104 into an operational position to block the glare of the sun, for example.

As described more fully below, some examples of the sun visor 102 incorporate a rotary detent mechanism that seeks to facilitate precise rotational movement and secure positioning of the sun visor 102 and ensure the sun visor 102 remains fixed in a desired orientation to block sunlight or glare.

Figure 4B:
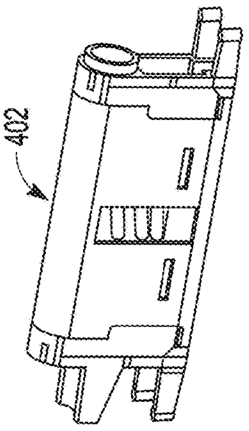
FIG. 4B is a pictorial view of the rotary detent mechanism of the sun visor.
Figure 4D:
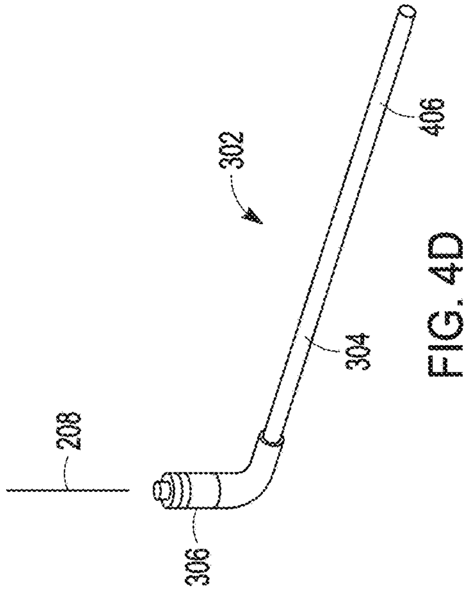
FIG. 4D is a pictorial view of the elbow tube of the sun visor, showing the flat portion that engages with the rotary detent mechanism.
Figure 4A:
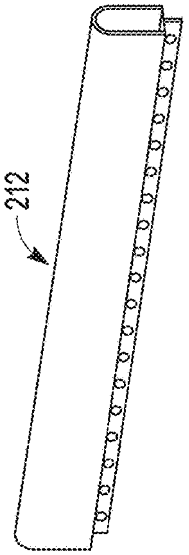
FIG. 4A is a pictorial view of the hinge tube of the sun visor.

Exemplary components of the sun visor 102 are shown in pictorial form in FIGS. 4A-4E. FIG. 4A shows a pictorial view of the example hinge tube 212. In some examples, the hinge tube 212 is an extruded aluminum element having a wall thickness in a range 0.3-0.6 millimeters (mm), and in some examples a wall thickness of 0.4 mm.

FIG. 4B shows a pictorial view of an example rotary detent mechanism 402. In some examples, the rotary detent mechanism 402 is located within the hinge tube 212 and is arranged such that one or more springs of the rotary detent mechanism 402 urge a flat detent bar to engage with a flat portion provided on the elbow tube 302, as described more fully below. Other example components and operations of the rotary detent mechanism 402 are also described.

Figure 4C:
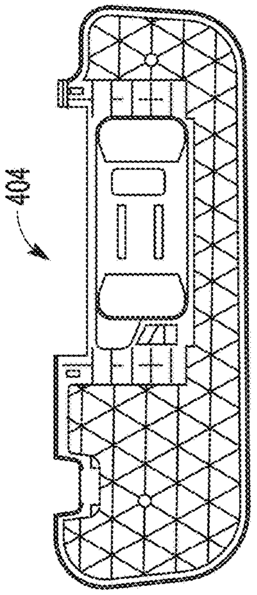
FIG. 4C is a pictorial view of a frame half of the sun visor.

FIG. 4C shows a pictorial view of an example frame half 404 of a left-handed sun visor 102. In some examples, two frame halves 404 are heat welded together to form a glare shield for the sun visor 102, also described more fully below.

FIG. 4D shows a pictorial view of an example elbow tube 302. The generally horizontal portion 304 and the generally vertical portion 306 of the elbow tube 302 defining the swing axis 208 are also shown. The flat portion 406 on the horizontal portion 304 of the elbow tube 302 that engages with the rotary detent mechanism 402 is also indicated. The flat portion 406 engages with components of the rotary detent mechanism 402 in a manner described more fully below.

Figure 4E:
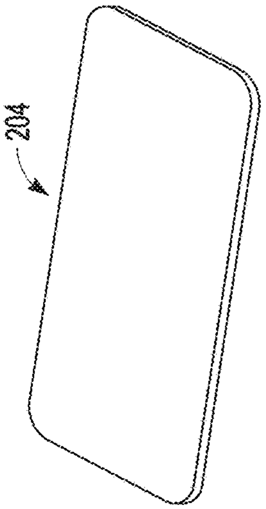
FIG. 4E is a pictorial view of the mirror component of the sun visor.

Finally, FIG. 4E shows a pictorial view of an example mirror 204 of the sun visor 102. The manner in which the mirror 204 and mirror cover assembly 526 are mounted into the sun visor 102 is also described more fully below.

Figure 5:
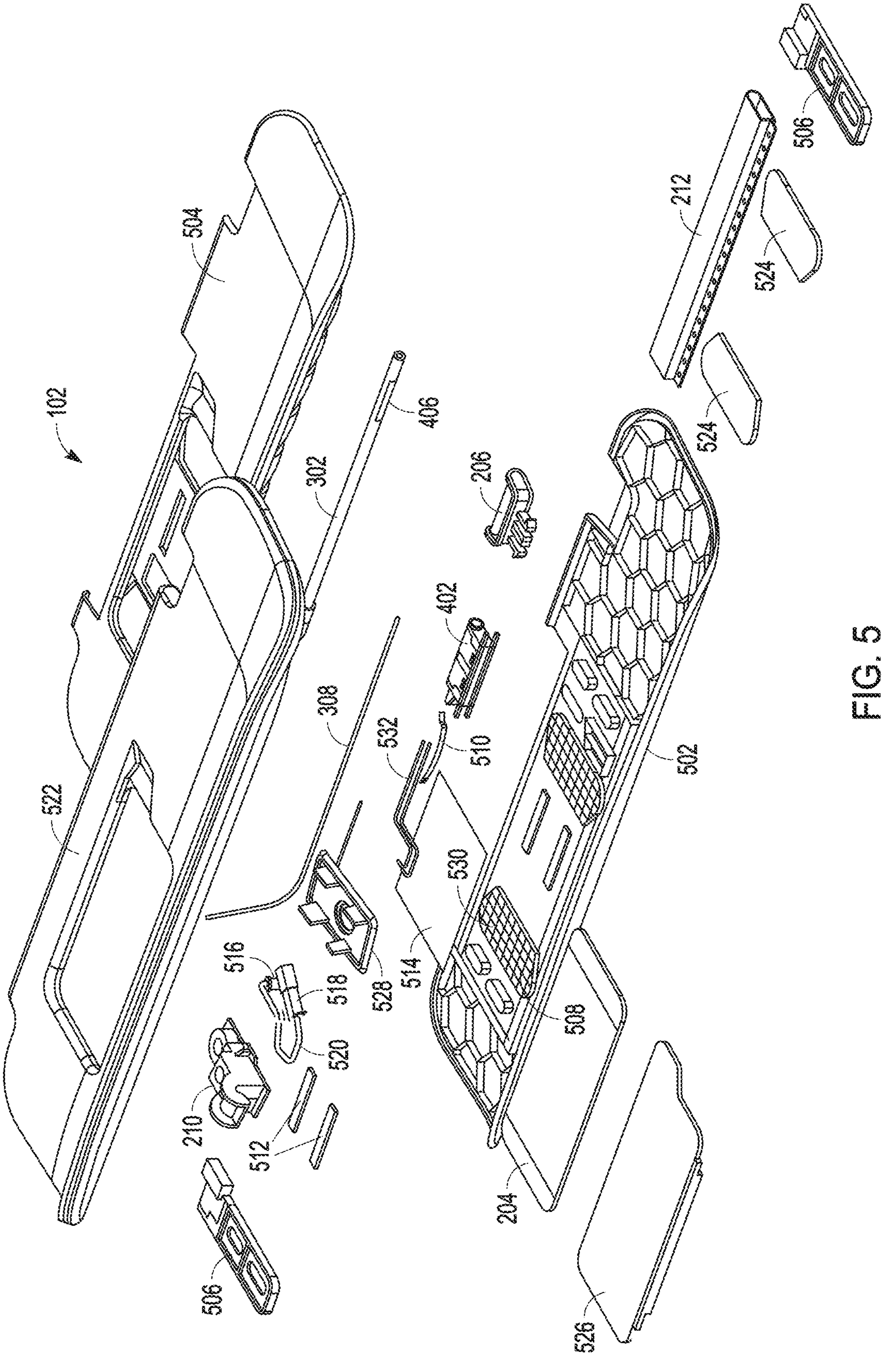
FIG. 5 is an exploded view of the sun visor, illustrating the assembly of its various components.

These and further detailed components of a sun visor 102 are shown in FIG. 5. In the illustrated case, the sun visor 102 is a left handed sun visor. In some examples, similar components are provided for a right-handed sun visor 102, but in some instances, these may be provided in an opposite configuration, or mirror-image form. In the provided view, a fully assembled sun visor 102 is shown above its constituent parts. The constituent parts are illustrated and arranged in exploded view below the assembled sun visor 102. In some examples, the sun visor 102 is an assembly comprising various components designed to function together to provide both utility and aesthetic enhancement.

The illustrated parts of the example sun visor 102 include in sum a lower or first frame half 502, an upper or second frame half 504, one or more end inserts 506, a PCB support 508, a contact piece 510, a mirror latch magnet 512, a mirror backing 514, a hinge tube 212, an elbow tube 302, an elbow tube screw 516, a D-ring 206, a terminal housing 518, a heat shrinking tube 520, a trim fabric 522, LED lamps 524, a mirror cover assembly 526, a mounting bracket 210, a mounting bracket cover 528, a visor tip latch magnet 530, and a bottom frame contact 532.

The first frame half 502 and the second frame half 504 form the frame 202 or main body of the sun visor 102. In some examples, these frame halves are made from a durable plastic material, such as polypropylene with glass fiber (PP GF20) and are heat-welded together to create a solid, unified structure. This configuration removes the need in some examples for an expanded polypropylene (EPP) layer, thus reducing the overall thickness of the sun visor 102 and contributing to a more streamlined appearance.

An end insert 506 is provided at each end of the sun visor 102, serving as a structural element to support and reinforce the connection between the sun visor and the elbow tube 302. As described above, cooperation between the hinge tube 212 and the elbow tube 302 enables the sun visor 102 to pivot up and down vertically and/or rotate horizontally around the swing axis 208. The elbow tube 302 is hollow allowing for the power cable 308 that provides electrical connectivity to the LED lamps 524 and other components within the sun visor 102. The LED lamps 524 are integrated into the sun visor 102 to provide illumination, enhancing the functionality of the mirror 204. These lamps are powered by the power cable 308 running through the elbow tube 302. The other components may include one or more of the contact piece 510, the terminal housing 518, the heat shrinking tube 520, and the bottom frame contact 532. In some examples, these components serve to connect and energize the LED lamps 524 when the sun visor 102 is pivoted open or closed, or when the mirror cover assembly 526 is opened for example. In some examples, the LED lamps 524 may be depowered when the mirror cover assembly 526 is shut. Other lighting arrangements are possible. The Printed Circuit Board (PCB) support 508 is provided for mounting electronic components, and the contact piece 510 can facilitate electrical connections.

The elbow tube screw 516 connects the elbow tube 302 into the mounting bracket 210. In some examples, the mounting bracket 210 includes the mounting bracket cover 528 which may be provided in a color that compliments the color of the headliner 104 or other components visible within the vehicle interior. The bracket cover 528 provides a flush fit with the vehicle's headliner 104.

The sun visor 102 incorporates a rotary detent mechanism 402 housed within the hinge tube 212. The rotary detent mechanism 402 is responsible for the precise and secure positioning of the sun visor 102. As described further below, in some examples the rotary detent mechanism 402 includes a detent subframe, a detent spring support, one or more detent springs, a detent bar, and a detent cover. These components work in concert to provide a clicking or camming action that secures the sun visor 102 in place once a desired position (typically the stowed position) or angle is achieved, preventing unwanted movement during vehicle operation. In some examples, the clicking action may also serve to impart a pleasing or reassuring "feel" to an operator of the sun visor 102. The visor tip latch magnet 530 helps to secure the sun visor 102 in the stowed position.

In some examples, the mirror 204 is affixed to the mirror backing 514 that provides a stable base for the reflective surface. The mirror 204 is typically made from a thin, high-strength material such as gorilla glass or polycarbonate to maintain the reduced profile of the sun visor. The mirror 204 may also include a mirror cover assembly 526 that protects the mirror when not in use, and a mirror latch magnet 512.

Additional components of the sun visor assembly include a D-ring 206 for securing the sun visor to the headliner 104 or a complementary bracket when not in use. The sun visor 102 also includes a trim fabric 522 that wraps around the frame halves to provide a finished look and a soft touch.

Figure 6:
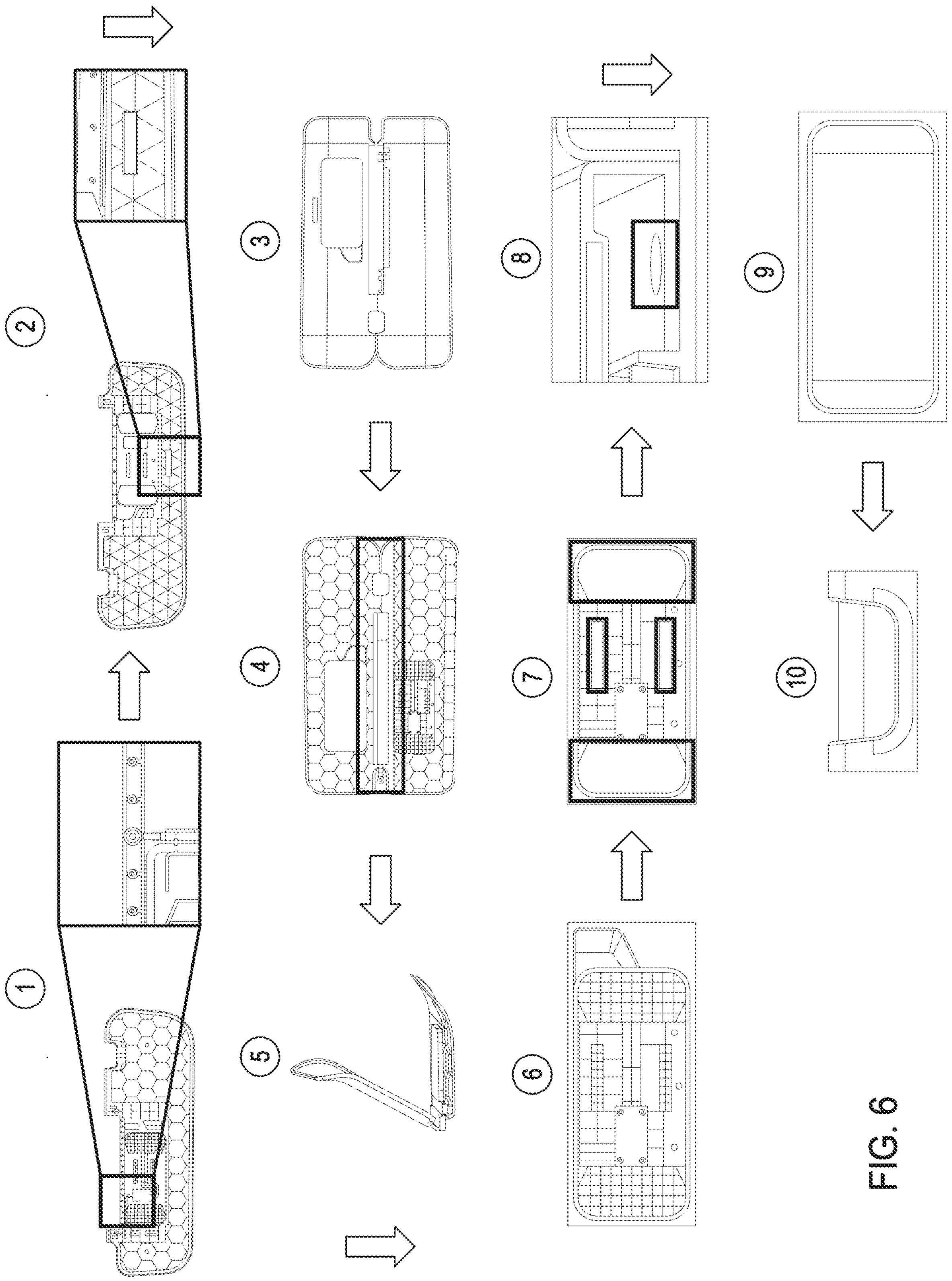
FIG. 6 is a flow diagram illustrating the assembly process for the sun visor.

With reference to FIG. 6, an example assembly process for the sun visor 102 is now described. In operation 1, the bottom frame contact 532 is attached to the lower or first frame half 502 using a heat stake. In operation 2, the visor tip latch magnet 530 is attached to the upper or second frame half 504. In operation 3, both the first frame half 502 and the second frame half 504 are brought together as a pair and wrapped with the trim fabric 522 while the first frame half 502 and the second frame half 504 are in an open or "butterfly" configuration, as shown. In operation 4, a hinge subassembly is formed by assembling the rotary detent mechanism 402, the hinge tube 212, and the elbow tube 302 to the fabric-wrapped first frame half 502 and the second frame half 504 while the latter components are in the open or butterfly configuration. In operation 5, the open first frame half 502 and the second frame half 504 are closed together and joined by hot welding. In operation 6, fine wrapping is performed, particularly in the area of the mirror 204 for aesthetic trim and neat appearance. In operation 7, the mirror latch magnets 512 and the LED lamps 524 are attached to the lower or first frame half 502 in areas designated for these components shown in the view. In operation 8, the mirror cover assembly 526 is assembled, for example by a heat stake, to the upper or second frame half 504. In operation 9, the mirror 204 is attached to the mirror cover assembly 526. In operation 10, the D-ring 206 is attached the final assembly.

Although the described flow diagram shows operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems.

Figure 7:
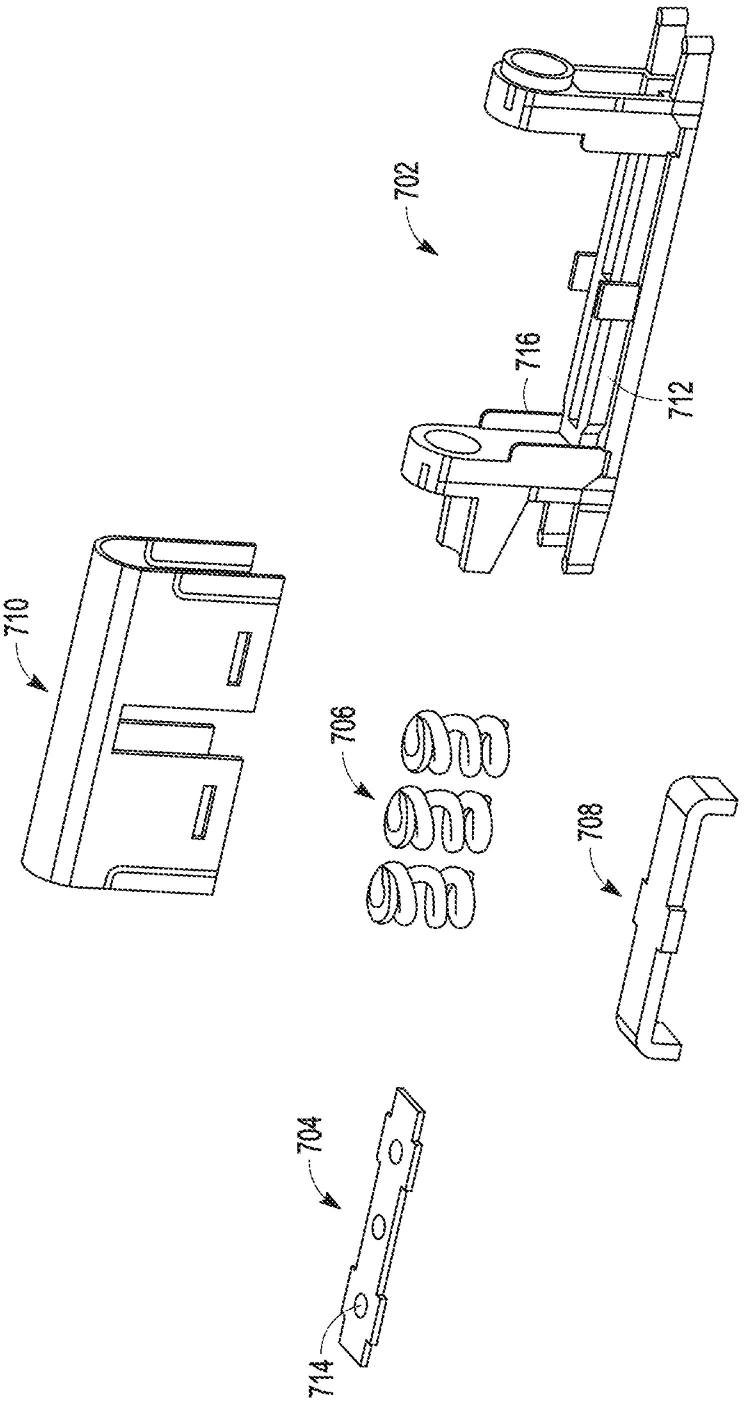
FIG. 7 is a pictorial view of the disassembled components of the rotary detent mechanism.
Figure 8:
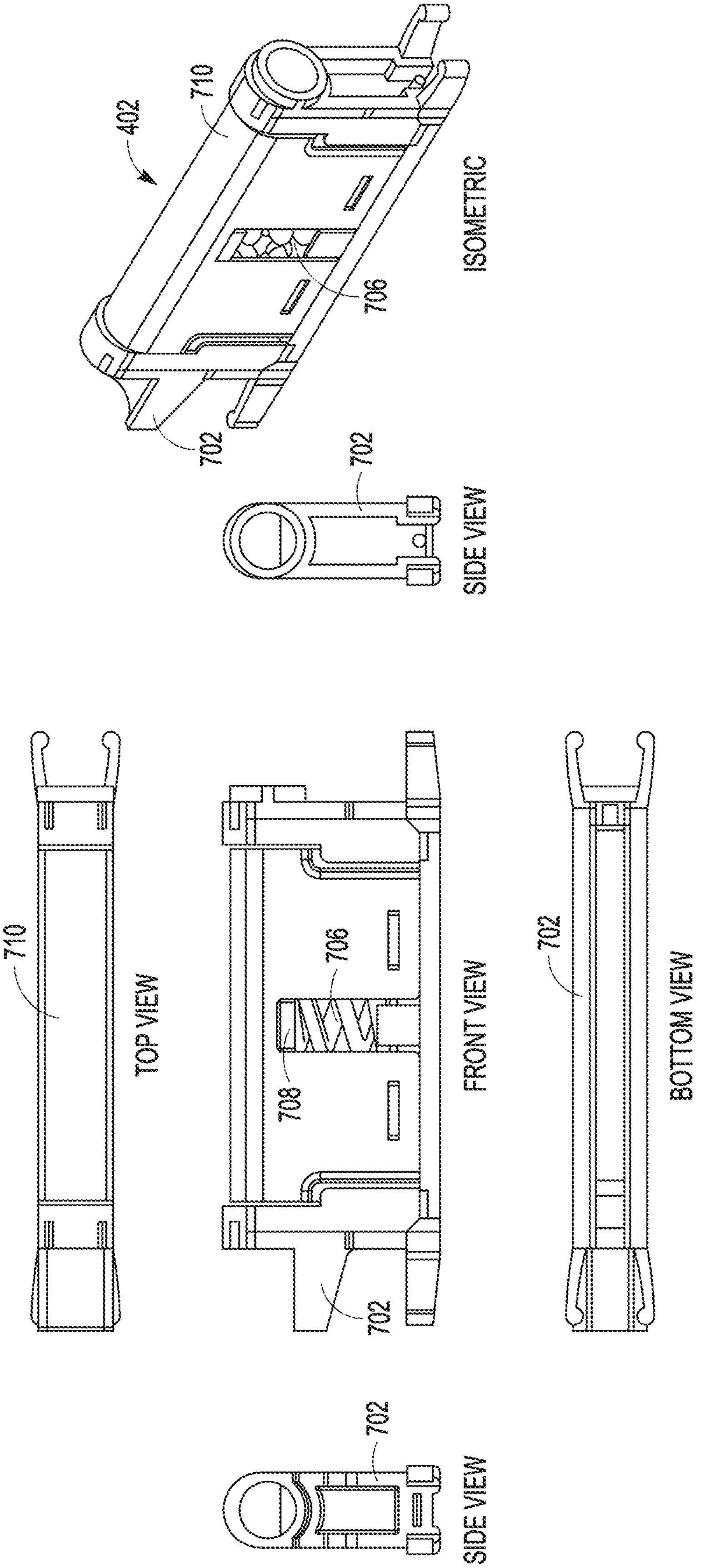
FIG. 8 shows various views of the assembled rotary detent mechanism, including top, bottom, side, front, and isometric views.

With reference to FIG. 7, components of the rotary detent mechanism 402 are now described. This view shows the detent components respectively in pictorial, disassembled form. FIG. 8 shows top, bottom, side, front, and isometric views of an assembled rotary detent mechanism 402. In some examples, the rotary detent mechanism 402 includes a detent subframe 702, a detent spring support 704, one or more detent springs 706, a detent bar 708, and a detent cover 710. A base 712 of the detent subframe 702 supports the detent spring support 704. A series of spring locators 714 on the detent spring support 704 serves to locate a respective lower end (in the view) of each of the detent springs 706. The detent springs 706 stand upright (in the view) and supported on the detent spring support 704 inside the detent cover 710. The upper end of each of the detent springs 706 acts on the detent bar 708. The detent bar 708 is movable upwards and downwards under action of the detent springs 706 and is guided within the detent cover 710 by one or more guide rails 716 of the detent subframe 702. By dint of being a flat bar, the detent bar 708 provides a broad "areal" engagement surface that can act on the flat portion 406 of the elbow tube 302 in use. A single linear or point contact area of a conventional or bare spring arrangement is thus avoided. The provision of three detent springs 706 spreads the spring loads across the length of the detent bar 708. Other arrangements are possible.

Figure 9:
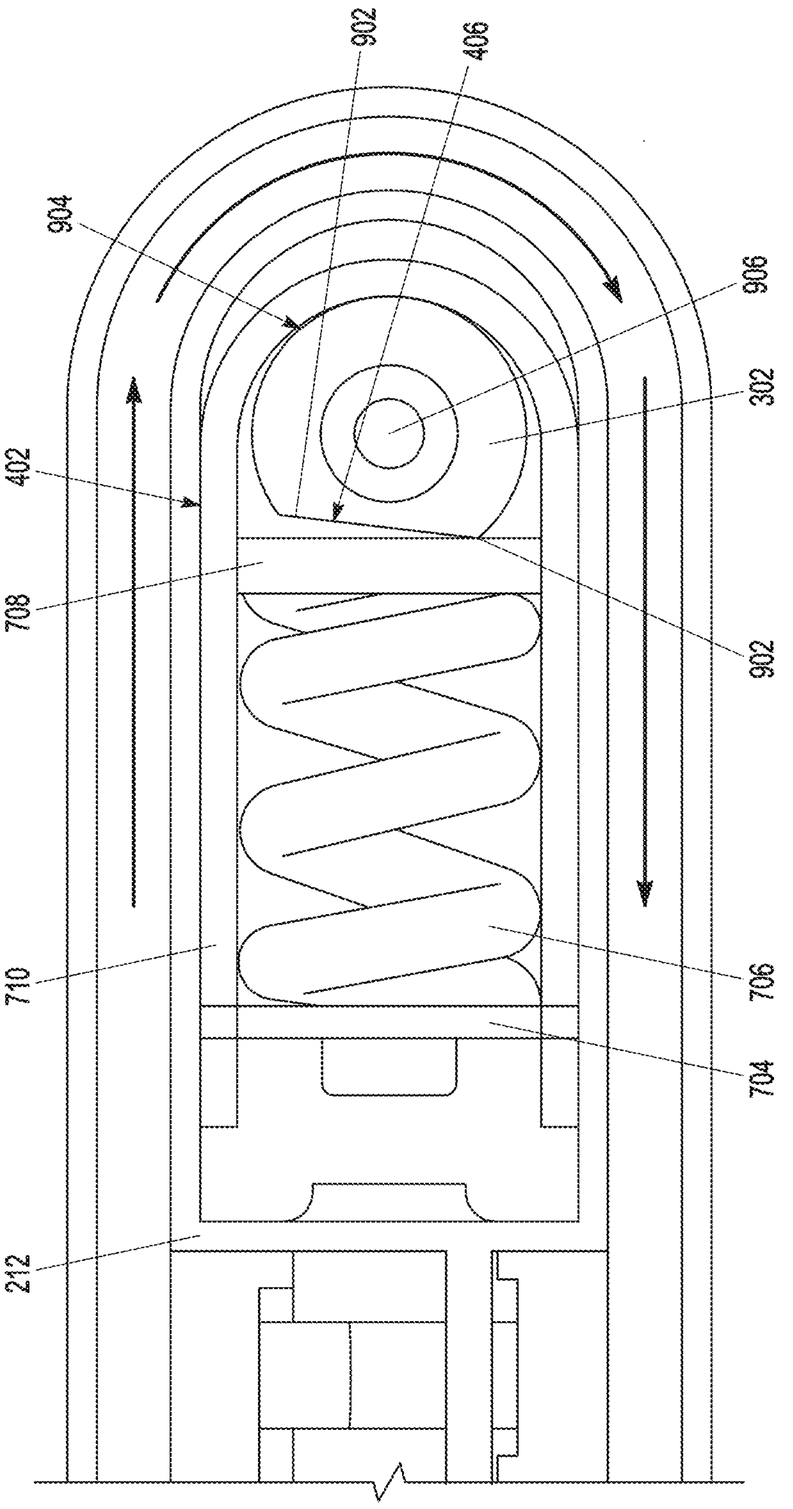
FIG. 9 is a detailed view of the rotary detent mechanism located within the hinge tube at the flat portion of the elbow tube.

An example arrangement can be seen in FIG. 9 that shows the rotary detent mechanism 402 located inside the hinge tube 212 at the location of the flat portion 406 of the elbow tube 302 of the sun visor 102. The detent spring support 704 is shown supporting the detent springs 706. The detent springs 706 act on the detent bar 708. The detent cover 710 that accommodates the detent spring support 704, the detent springs 706, and the detent bar 708 is supported by the inner walls of the hinge tube 212.

The detent springs 706 contract to the left (in the view) when the sun visor 102 is rotated to press or urge a camming edge 902 of the flat portion 406 of the elbow tube 302 against the detent bar 708. The detent springs 706 contract axially because the tubular surface 904 pushing them in that direction has a relatively long radial distance from the longitudinal axis 906 of the elbow tube 302 as compared to the flat portion 406 which has a relatively short distance to the longitudinal axis 906 of the elbow tube 302. When contracted, the detent springs 706 act against the tubular surface 904 of the elbow tube 302. The camming edge 902 therefor serves as a stepwise discontinuity when the detent bar 708 passes over it. The edges of the flat portion 406 define two camming edges 902 in the illustrated example.

The detent springs 706 can be released to extend in length to the right in the view. When extended, the detent springs 706 act against the flat portion 406 of the elbow tube 302. In the illustrated arrangement, the extension of the detent springs 706 occurs when the sun visor 102 is in the stowed position lying flush up against the headliner 104 as shown. The detent springs 706 continuously urge the detent bar 708 resiliently against the tubular surface and the flat portion 406 of the elbow tube 302. When the detent bar 708 passes the camming edges 902, there is a step-wise or "clicking" action (mentioned above) as the detent bar 708 moves from the tubular surface 904 to the flat portion 406 that may serve to impart a pleasing or reassuring "feel" when the sun visor 102 is returned to its stowed position, as shown.

Figure 10:
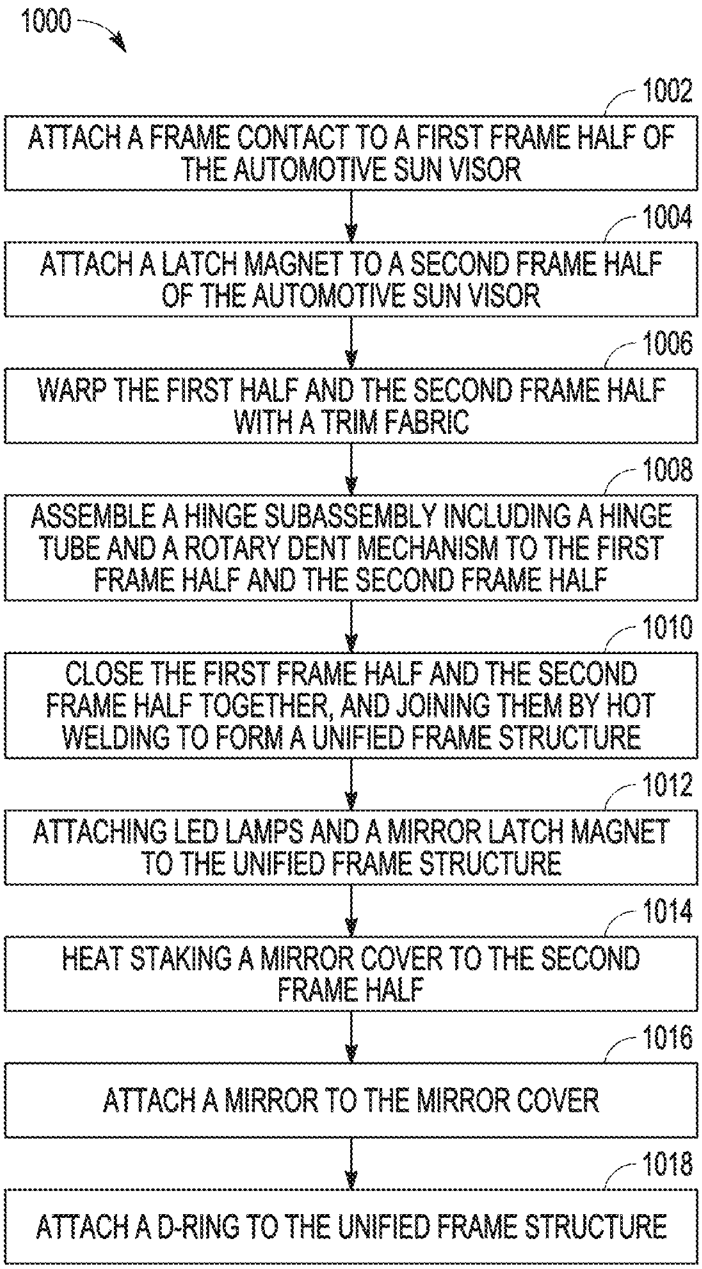
FIG. 10 illustrates a method of assembling the sun visor in accordance with one embodiment.

Some examples include method embodiments. With reference to FIG. 10, a method 1000 of assembling an automotive sun visor comprises: in operation 1002, attaching a frame contact to a first frame half of the automotive sun visor. In operation 1004, method 1000 attaches a tip latch magnet to a second frame half of the automotive sun visor. In operation 1006, method 1000 wraps the first frame half and the second frame half with a trim fabric. In operation 1008, method 1000 assembles a hinge subassembly including a hinge tube and a rotary detent mechanism to the first frame half and the second frame half. In operation 1010, method 1000 closes the first frame half and the second frame half together, and joins them by hot welding to form a unified frame structure. In operation 1012, method 1000 attaching LED lamps and a mirror latch magnet to the unified frame structure. In operation 1014, method 1000 heat staking a mirror cover to the second frame half. In operation 1016, method 1000 attaches a mirror to the mirror cover. In operation 1018, method 1000 attaches a D-ring to the unified frame structure.

The method 1000 may also include integrating a power cable through an elbow tube of the hinge subassembly to electrically connect the LED lamps to a vehicle power source. In some examples, wrapping the first frame half and the second frame half with the trim fabric includes fine wrapping tuning in an area adjacent the mirror. The method 1000 may also include attaching the frame contact to the first frame half using a heat stake to secure the frame contact to the first frame half. In some examples, assembling the hinge subassembly includes positioning the rotary detent mechanism within the hinge tube and securing the hinge tube to an elbow tube. The method 1000 may also include securing a mounting bracket to a headliner of a vehicle, where the hinge subassembly is configured to engage with the mounting bracket to allow for rotational movement of the automotive sun visor around an upright swing axis defined by the elbow tube. Other technical features may be readily apparent to one skilled in the art from the following figures, descriptions, and claims.

Although the described flow diagram shows operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems.

In other aspects, some examples directly mount the sun visor 102 to the headliner 104 and avoid the need for a mounting bracket 210. This may reduce interface between parts even further to achieve a clean design.

Some examples integrate wireless power and data transmission capabilities. These examples seek to eliminate the need for traditional wiring harnesses within the sun visor assembly, thereby enabling a more streamlined design and reducing manufacturing complexity.

In some examples, the sun visor 102 incorporates a rechargeable energy source, such as a battery pouch or a capacitor, which is charged wirelessly. The charging mechanism operates on the principle of inductive energy transmission, or a wireless charger. The energy transfer occurs when the sun visor is in a stowed position, in contact with the headliner surface, allowing for the charging of the energy source through multiple layers of polymer substrates and fabrics.

When the sun visor is deployed, the charging ceases, and the stored energy in the rechargeable battery pouch or capacitor is utilized to power integrated LED vanity lights. In some examples, this wireless charging feature simplifies the sun visor's design by removing the need for a physical electrical connection and also enhances user experience by providing uninterrupted functionality.

Some example sun visors 102 include a hybrid screen/mirror. This feature allows the display of useful information such as local weather, time, state of charge, and other user interface (UI) relevant data. In some examples, the information is transmitted wirelessly using the same inductive unit installed within the sun visor and the headliner, allowing seamless data flow without the need for physical connectors.

The elimination of the wiring harness from the sun visor assembly allows for a reduction in the cross-section of the metal rod or elbow arm, which traditionally housed the wiring. This reduction enables new design possibilities for a sleeker and more aesthetically pleasing sun visor profile. Additionally, the wireless technology facilitates the pre-installation of sun visors to the headliner at the supplier's site, which can lead to a reduction in part count and assembly time at the factory.

The disclosed sun visor design also includes a provision for displaying regional-specific warnings, such as child seat airbag notifications, directly on the screen integrated into the mirror. This feature adds an extra layer of safety and compliance by ensuring that critical information is readily visible to the vehicle occupants.

EXAMPLES

Thus, some embodiments may include one or more of the following examples.

Example 1. An automotive sun visor comprising: a frame configured to be mounted adjacent a windshield of a vehicle;

a rotary detent mechanism to facilitate a secure positioning of the automotive sun visor, the rotary detent mechanism housed within a hinge tube of the automotive sun visor the rotary detent mechanism including a detent bar urged by a plurality of detent springs to engage with a flat portion of an elbow tube defining a swing axis of the automotive sun visor wherein the elbow tube is configured to support the automotive sun visor rotatably and slidably thereon, allowing for axial adjustment and pivotal movement between a stowed position and an operational position of the automotive sun visor.

Example 2. The automotive sun visor of example 1, wherein the frame comprises two frame halves of durable plastic material, the two frame halves being heat-welded together to form a unified structure.

Example 3. The automotive sun visor of example 2, wherein the durable plastic material of the two frame halves includes polypropylene and glass fiber material.

Example 4. The automotive sun visor of any one of examples 1-3, wherein the hinge tube includes an extruded aluminum element with a wall thickness in a range of 0.3-0.6 millimeters.

Example 5. The automotive sun visor of any one of examples 1-4, further comprising a mirror integrated into the frame, the mirror including a material selected from a group comprising gorilla glass and polycarbonate, and having a mirror thickness in a range 0.5-1 millimeters.

Example 6. The automotive sun visor of any one of examples 1-5, further comprising LED lamps integrated into the frame and configured to provide illumination when the automotive sun visor is in the operational position.

Example 7. The automotive sun visor of any one of examples 1-6, wherein the rotary detent mechanism includes a detent subframe, a detent spring support, the plurality of detent springs, the detent bar, and a detent cover, the detent bar being movable within the detent cover and guided by guide rails of the detent subframe.

Example 8. The automotive sun visor of any one of examples 1-7, wherein the elbow tube is hollow and configured to accommodate one or more power cables for electrical components of the automotive sun visor.

Example 9. A rotary detent mechanism for an automotive sun visor, comprising: a detent subframe configured to be housed within a hinge tube of the automotive sun visor; a detent spring support mounted on the detent subframe; a plurality of detent springs supported by the detent spring support; a detent bar urged by the plurality of detent springs to engage with a flat portion of an elbow tube, wherein the elbow tube defines a swing axis of the automotive sun visor and includes a camming edge that interacts with the detent bar to provide a clicking action indicative of the automotive sun visor reaching a desired position; and a detent cover accommodating the detent spring support, the plurality of detent springs, and the detent bar, wherein the detent cover is supported by inner walls of the hinge tube.

Example 10. The rotary detent mechanism of example 9, wherein the detent bar is or includes a flat bar formation providing an aerial engagement surface with the flat portion of the elbow tube, and wherein the plurality of detent springs are distributed along a length of the detent bar to spread spring loads thereon.

Example 11. A detent system for securing a position of an automotive sun visor, the detent system comprising: an elbow tube having a flat portion defining a camming edge, the elbow tube defining a swing axis for the automotive sun visor and being configured to support the automotive sun visor for rotational and axial movement within an automotive; a hinge tube slidably and rotatably mounted on the elbow tube; a detent bar disposed within the hinge tube and configured to engage with the flat portion of the elbow tube; and a plurality of detent springs configured to urge the detent bar against the flat portion of the elbow tube, wherein the plurality of detent springs are responsive to the camming edge to provide a step-wise engagement as the automotive sun visor is moved to a secured position.

Example 12. The detent system of example 11, wherein the detent bar facilitates a secure and precise positioning of the automotive sun visor by providing a clicking action as the detent bar engages with the camming edge during rotation of the automotive sun visor.

Example 13. The detent system of example 11 or 12, wherein the camming edge of the elbow tube is configured to compress the plurality of detent springs when the automotive sun visor is rotated away from a stowed position, and wherein the plurality of detent springs are configured to extend and urge the detent bar against the flat portion of the elbow tube when the automotive sun visor is in the stowed position, thereby providing a tactile feedback to a user indicative of the automotive sun visor being securely positioned.

Example 14. An automotive sun visor frame comprising: a first frame half and a second frame half, each frame half including a durable plastic material and configured to form a unified structure when joined; wherein the first frame half and the second frame half are heat-welded together along their respective edges; and wherein the unified structure includes an integrated channel to accommodate a hinge tube for an attachment of a rotary detent mechanism.

Example 15. The automotive sun visor frame of example 14, wherein the first frame half and the second frame half are heat-welded together devoid of an expanded polypropylene (EPP) layer therebetween.

Example 16. The automotive sun visor frame of example 13 or 14, wherein the durable plastic material comprises polypropylene having a glass fiber content of 20 percent by weight.

Example 17. A method of assembling an automotive sun visor, the method comprising: attaching a frame contact to a first frame half of the automotive sun visor; attaching a tip latch magnet to a second frame half of the automotive sun visor; wrapping the first frame half and the second frame half with a trim fabric; assembling a hinge subassembly including a hinge tube and a rotary detent mechanism to the first frame half and the second frame half; closing the first frame half and the second frame half together, and joining them by hot welding to form a unified frame structure; attaching LED lamps and a mirror latch magnet to the unified frame structure; heat staking a mirror cover to the second frame half; attaching a mirror to the mirror cover; and attaching a D-ring to the unified frame structure.

Example 18. The method of example 17, further comprising integrating a power cable through an elbow tube of the hinge subassembly to electrically connect the LED lamps to a vehicle power source.

Example 19. The method of example 16 or 17, wherein wrapping the first frame half and the second frame half with the trim fabric includes fine wrapping tuning in an area adjacent the mirror.

Example 20. The method of any one of examples 16-19, wherein attaching the frame contact to the first frame half includes using a heat stake to secure the frame contact to the first frame half.

Example 21. The method of any one of example 16-20, wherein assembling the hinge subassembly includes positioning the rotary detent mechanism within the hinge tube and securing the hinge tube to an elbow tube.

Example 22. The method of any one of examples 16-21, further comprising securing a mounting bracket to a headliner of a vehicle, wherein the hinge subassembly is configured to engage with the mounting bracket to allow for rotational movement of the automotive sun visor around an upright swing axis defined by the elbow tube.

Example 23. An automotive sun visor comprising: a body configured to be mounted to a headliner of a vehicle; an integrated wireless power and data transmission unit; a rechargeable energy source within the body, the rechargeable energy source being chargeable wirelessly when the automotive sun visor is in a stowed position against the headliner; and an integrated display screen capable of showing user interface data transmitted wirelessly to the integrated wireless power and data transmission unit.

Example 24. The automotive sun visor of example 23, wherein the body is configured to be mounted directly to the headliner to bring the automotive sun visor flush with the headliner without intervention of a mounting bracket.

Example 25. The automotive sun visor of example 23 or 24, wherein the integrated wireless power and data transmission unit enables inductive energy transfer through one or more layers of polymer substrate and/or fabric.

Example 26. The automotive sun visor of any one of examples 23-25, wherein the rechargeable energy source comprises a battery pouch or a capacitor.

Example 27. The automotive sun visor of any one of examples 23-26, wherein the rechargeable energy source can power integrated LED vanity lights when the automotive sun visor is deployed.

Example 28. The automotive sun visor of any one of examples 23-27, wherein the integrated display screen is a hybrid screen/mirror capable of switching between a reflective surface and a display for presenting information.

Example 29. The automotive sun visor of any one of examples 23-28, wherein the information displayed on the hybrid screen/mirror includes at least one of local weather, time, state of charge, and regional-specific warnings.

Example 30. The automotive sun visor of any one of examples 23-29, further comprising a provision for pre-installation of the automotive sun visor to the headliner.

While the above is a detailed description of the example embodiments of the inventive subject matter, various alternatives, modifications, and equivalents may be used. Therefore, the above description should not be taken as limiting the scope of the inventive subject matter which is defined by the appended claims.

It should be noted that the description and the figures above merely illustrate the principles of the present subject matter along with examples described herein and should not be construed as a limitation to the present subject matter. It is thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration.

Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few. The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal.

In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Although the described flow diagrams herein can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially, concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

It will also be appreciated that one or more of the elements depicted in the drawings/figures can also be implemented in a more separated or integrated manner, or even removed or rendered as inoperable in certain cases, as is useful in accordance with a particular application.

What is claimed is:

1. A rotary detent mechanism for an automotive sun visor, comprising:

- a detent subframe configured to be housed within a hinge tube of the automotive sun visor;
- a detent spring support mounted on the detent subframe;
- a plurality of detent springs supported by the detent spring support;
- a detent bar urged by the plurality of detent springs to engage with a flat portion of an elbow tube, wherein the elbow tube defines a swing axis of the automotive sun visor and includes a camming edge that interacts with the detent bar to provide a clicking action indicative of the automotive sun visor reaching a desired position, wherein the detent bar is movable upwards and downwards under action of the plurality of detent springs and is configured to be guided within a detent cover by one or more guide rails of the detent subframe; and
- a detent cover accommodating the detent spring support, the plurality of detent springs, and the detent bar, wherein the detent cover is supported by inner walls of the hinge tube.

2. The rotary detent mechanism of claim 1, wherein the detent bar is or includes a flat bar formation providing an areal engagement surface with the flat portion of the elbow tube, and wherein the plurality of detent springs are distributed along a length of the detent bar to spread spring loads thereon.

3. The rotary detent mechanism of claim 1, wherein the detent spring support includes a plurality of spring locators, each spring locator configured to locate a respective end of a corresponding one of the plurality of detent springs.

4. The rotary detent mechanism of claim 1, wherein the plurality of detent springs comprises three detent springs distributed along a length of the detent bar.

5. The rotary detent mechanism of claim 1, wherein the detent subframe includes a base that supports the detent spring support.

6. The rotary detent mechanism of claim 1, wherein the plurality of detent springs are configured to contract when the camming edge presses against the detent bar during rotation of the automotive sun visor away from a stowed position, and to extend to urge the detent bar against the flat portion of the elbow tube when the automotive sun visor is in the stowed position.

7. The rotary detent mechanism of claim 1, wherein one or more components of the rotary detent mechanism comprise polyoxymethylene.

8. A rotary detent mechanism for an automotive sun visor, comprising:

a detent subframe configured to be housed within a hinge tube of the automotive sun visor;

a detent spring support mounted on the detent subframe;

a plurality of detent springs supported by the detent spring support, wherein the detent spring support includes a plurality of spring locators, each spring locator configured to locate a respective end of a corresponding one of the plurality of detent springs;

a detent bar urged by the plurality of detent springs to engage with a flat portion of an elbow tube, wherein the elbow tube defines a swing axis of the automotive sun visor and includes a camming edge that interacts with the detent bar to provide a clicking action indicative of the automotive sun visor reaching a desired position; and a detent cover accommodating the detent spring support, the plurality of detent springs, and the detent bar, wherein the detent cover is supported by inner walls of the hinge tube.

9. A rotary detent mechanism for an automotive sun visor, comprising:

a detent subframe configured to be housed within a hinge tube of the automotive sun visor;

a detent spring support mounted on the detent subframe, wherein the detent subframe includes a base that supports the detent spring support;

a plurality of detent springs supported by the detent spring support;

a detent bar urged by the plurality of detent springs to engage with a flat portion of an elbow tube, wherein the elbow tube defines a swing axis of the automotive sun visor and includes a camming edge that interacts with the detent bar to provide a clicking action indicative of the automotive sun visor reaching a desired position; and a detent cover accommodating the detent spring support, the plurality of detent springs, and the detent bar, wherein the detent cover is supported by inner walls of the hinge tube.

* * * * *